United States Patent [19]

Biondetti

[11] Patent Number: 5,163,336
[45] Date of Patent: Nov. 17, 1992

[54] VIBRATION DEVICE

[75] Inventor: Mario Biondetti, Schio/Vicenza, Italy

[73] Assignee: Suzler-Escher Wyss GmbH, Ravensburg, Fed. Rep. of Germany

[21] Appl. No.: 664,864

[22] Filed: Mar. 5, 1991

[30] Foreign Application Priority Data

Mar. 6, 1990 [DE] Fed. Rep. of Germany ....... 4007005

[51] Int. Cl.⁵ ............................................ F16H 33/00
[52] U.S. Cl. ................................................ 74/61; 74/87
[58] Field of Search ...................... 74/61, 87; 366/128

[56] References Cited

U.S. PATENT DOCUMENTS

| | | | |
|---|---|---|---|
| 2,483,318 | 9/1949 | Lazan | 74/61 |
| 2,545,245 | 3/1951 | Stutz | 74/61 X |
| 2,930,244 | 3/1960 | Hutchinson et al. | 74/61 |
| 4,481,835 | 11/1984 | Storm | 74/61 |
| 4,561,319 | 12/1985 | Lilja | 74/61 |
| 4,568,218 | 2/1986 | Orzal | 74/87 X |
| 4,771,645 | 9/1988 | Persson | 74/61 |

Primary Examiner—Leslie A. Braun
Assistant Examiner—David W. Laub
Attorney, Agent, or Firm—Wolf, Greenfield & Sacks

[57] ABSTRACT

The vibration device according to the invention includes a compensating device influenced by compensating masses for exciting forces caused by the vibrationary movement, the compensating masses respectively being arranged as partial masses on a hollow shaft, being coaxial with respect to one another, and including a displacing rod in their center by means of which the partial masses of the compensating weights can be displaced in the same manner as the eccentric determining the vibrational movement.

17 Claims, 4 Drawing Sheets

VIBRATION DEVICE

BACKGROUND OF THE INVENTION

The invention relates to a vibration device for displacing a mass into a one-dimensional, reciprocating, forced movement, comprising a device for compensating the inertia force generated by the mass, which mass includes at least one pair of equally large compensating masses which, themselves or in cooperation with regard to their effective position, are changeable in position and rotatable in the opposing direction of rotation with respect to one another in such a manner that their centers of inertia, at the point in time of reversal of the mass, point in the direction with respect to the rotational axis opposite to the inertia force to be compensated at this point in time, their eccentricity and their mass being dimensioned such that their centrifugal forces effective during the rotation essentially compensate the inertia forces emanating from the one-dimensional reciprocating mass, the compensating masses respectively being arranged on coaxial shafts driven in opposite directions of rotation, one of the shafts being a hollow shaft by means of which the mass is moved via an eccentric device.

Such a vibration device is known from DE-PS 37 27 742 and is used, for example, for vibrating heavy cylinders of a paper machine in order to increase by means of the vibration the dewatering and quality of the resulting paper sheeet. The vibrational movement is effected in a horizontal direction, a one-dimensional movement transverse to the direction of movement being generated with two reversal points on account of the unvariable length of the paper machine screen. The vibration of the large mass of the cylinders in their axial, i.e. horizontal direction causes correspondingly large vibrations during the constant reciprocating acceleration and braking of the mass, which vibrations must be absorbed by the base of the machine via the structure of the machine. This effects and loads the entire building in which the machine is erected. By means of such a vibration device, the forces arising during the vibration are almost completely compensated for.

The compensating masses consist of partial masses which are located on disks rotating with the shafts, the disks being movable relative to one another along a circular path by means of a displacing mechanism. The center of inertia of the compensating masses ensuing on account of the displacement can therefore be adjusted, i.e. the eccentricity of the compensating masses to the rotating axis. The displacing mechanism serves to simultaneously displace the center of inertia of the compensating masses to a position which is advantageous for the set stroke of the vibrationary movement.

From DE-OS 27 38 794 a vibrator is known which is equipped with two coaxial shafts. Of these coaxial shafts, one is a hollow shaft. Coaxial shafts are adjustable with respect to one another by means of special devices.

It is an object of the invention to provide such a vibration device which particularly in view of the displacement of the inertia force compensating system, is constructed in such a way as to enable a displacement which is as simple as possible. Additionally, a compact structure is to be realized in accordance with the invention.

SUMMARY OF THE INVENTION

This object is solved in accordance with the invention in that the other shaft is also a hollow shaft in which a displacing rod is coaxially arranged, the displacing rod being displaceably connected with the compensating masses and/or the eccentric device held by supporting members via a steering.

The steering can either be a cam steering or a lever steering or a combination of both.

The arrangement of the driving shafts and the displacing device according to this solution allows for a compact construction and a simple displacement of the compensating masses relative to the mass movement.

Usefully, the dispacing rod is connected to a servomotor, in particular a hydraulic or pneumatic displacing device. If the displacing rod is connected with the other, inner hollow shaft so as not to rotate but to be relatively axially movable, then a bearing is located between the displacing rod and the displacing device, which allows for a relative rotation between both these parts. Thus, by means of a pneumatic or hydraulic reciprocating movement, a simple displacement of the displacing rod can ensue even if this rotates together with the rotating parts.

The displacing rod can be connected with the other, inner hollow shaft via two axially spaced lateral pins which are guided to both sides in longitudinal slots of this hollow shaft. One of the lateral pins is connected via a bearing with a cam following member in such a manner as to allow a relative rotation between the lateral pin and the cam following member. The cam following member engages a recess in the one, outer hollow shaft and a section of the compensating masses, one of the recesses being an oblong recess extending in the axial direction of the displacing rod and the other being a cam deviating from this in a curved inclined manner. The other lateral pin is securely fastened to a cam following member which engages in a recess in a section of the other compensating mass, the associated oblong slot of the other, inner hollow shaft or the recess in the section of the other mass compensating weight being a cam extending in a curved or inclined manner. The other then extends in the axial direction of the displacing rod. This means that a guidance in the one recess and a cam steering in the other for displacing the angular position of the compensating masses ensues, respectively.

Thus, a displacement of the compensating masses from a central axial position is possible although the inner and outer hollow shafts rotate in opposing rotational directions.

The recess in the one, outer hollow shaft is preferably an oblong slot extending in the axial direction of the displacing rod, a guiding member connected with the cam following member glides in this slot. The oblong slot arranged in the other, inner hollow shaft extends in the axial direction of the displacing rod, and a guiding member connected with the cam following member glides in this oblong slot.

Usefully, the invention is characterized by an advantageous development of the invention in that the displacing rod is connected with the other inner hollow shaft by means of two axially spaced lateral pins which are guided to both sides in oblong slots of these hollow shafts, that one of the lateral pins is connected via a bearing (relative rotational movement) with an angle lever, the centre of rotation of which is fixed on the outer hollow shaft, the angle lever transforming the axial movement of the displacing rod transmitted to a leg into an essentially peripheral movement transmitted to another leg, and this peripheral movement being transmitted to a section of the compensating masses, and that the other lateral pin is connected with an other angle lever, the centre of rotation of which is fixed on the hollow shaft, which angle lever transforms the axial movement of the lateral pin transmitted to a leg into an essentially peripheral movement transmitted to another leg, and that this peripheral movement is transmitted to a section of the other compensating mass.

The supporting members of the compensating masses can consist at least of two-part disks which are respectively supported via a bearing on the other, inner hollow shaft. This means that the parts of the disks can be shifted relative to one another, a partial mass being located on each part. This particularly allows for an easy displacement of the angular position of the compensating masses and thus of the effect of the compensating masses in relation to the generated vibrationary movement (eccentric adjustment).

Advantageously, and in particular in connection with the two-part disks, cam following members are arranged to both sides of the lateral rods, which members are respectively associated with a part of the disks supporting the compensating masses. Preferably, the displacing device for the compensating masses is also coupled with the eccentric device, and at least one part of one of the disks supporting the eccentric masses is connected with the eccentric device. Thus, in a displacement operation, it is possible to adjust the eccentric movement determining the vibrationary movement and coupled with this the effect of the compensating masses.

Preferably, the eccentric device consists of two coaxial eccentric members. If this is the case, each eccentric element can be connected respectively with one part of the disk supporting a partial mass.

In order to avoid a self-acting displacement of the angular position of the eccentric weights and also of the eccentric device during operation, the displacing device coacts with a disengagable coupling. Thus, at least one supporting member of the compensating masses can be connected via the coupling with the other, inner hollow shaft, which is released for the displacement.

BRIEF DESCRIPTION OF THE DRAWING

The invention is described in detail in the following on the basis of a purely schematically depicted, exemplified embodiment in the enclosed drawing, in which.

DETAILED DESCRIPTION OF THE PREFERRED EMBODIMENT

Figure 1A:
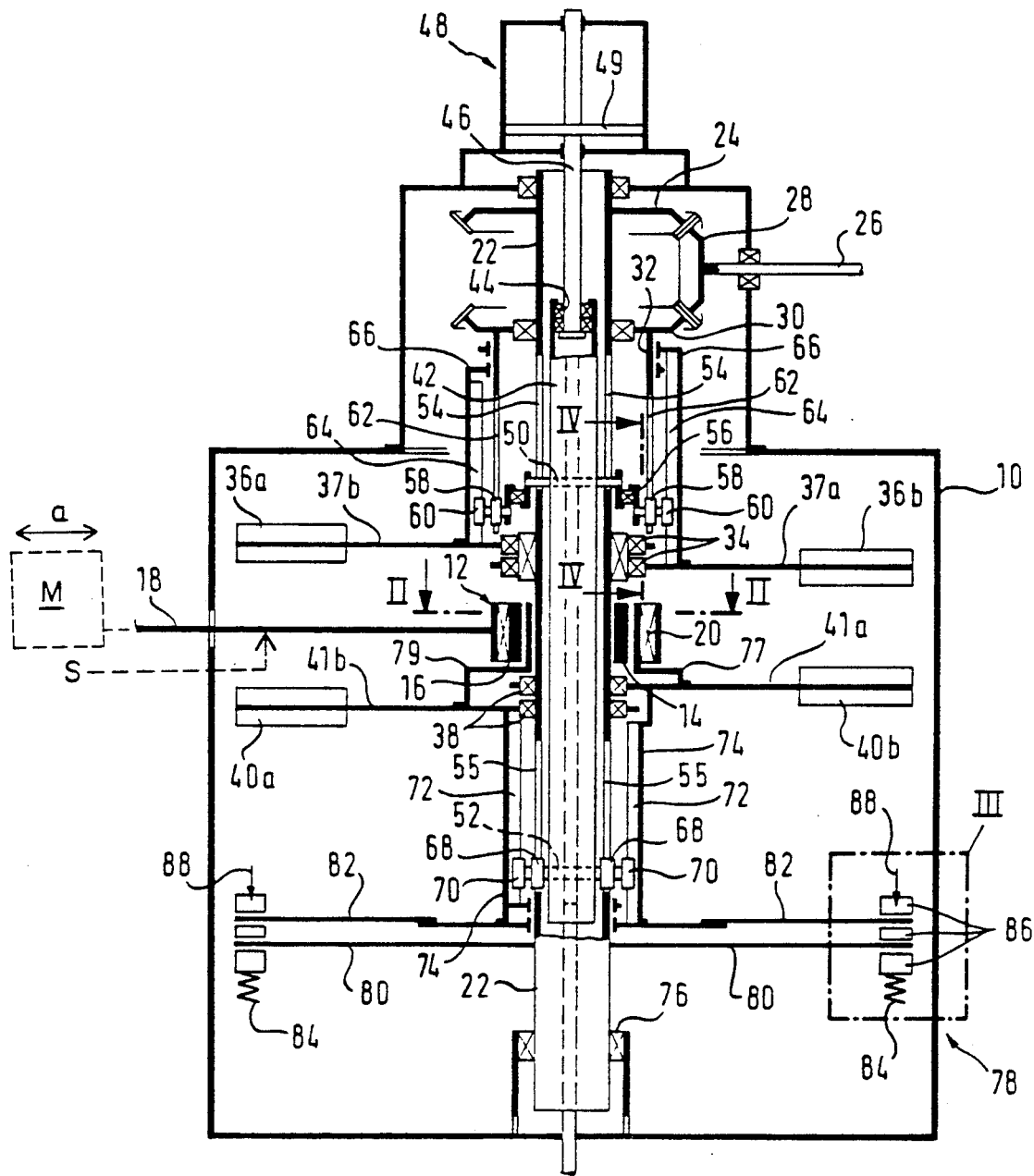
FIG. 1a shows a basic functional diagram of a vibration device according to the invention.
Figure 1B:
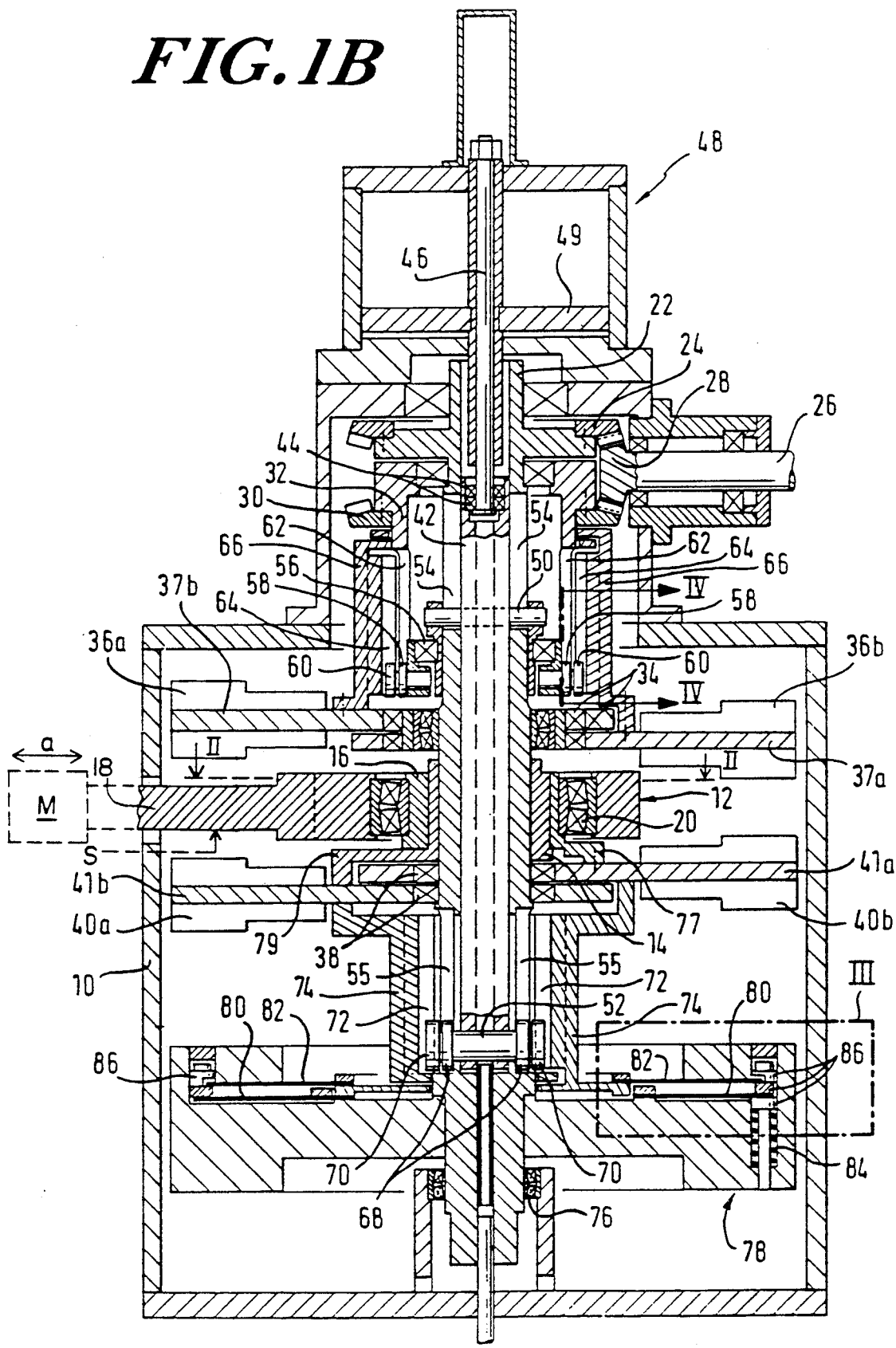
FIG. 1b shows a somewhat more detailed longitudinal cross-sectional view of a vibration device according to FIG. 1a, FIG. 2 shows a sectional view along the line II—II in FIG. 1b through the eccentric device and the vibration rod.
Figure 2:
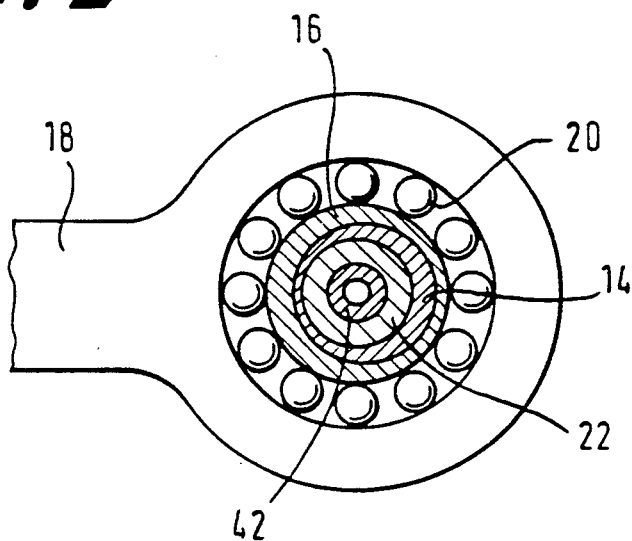

The vibration device according to FIG. 1a and 1b has a gear housing 10. In this gear housing 10, an eccentric device 12 is located comprising an inner eccentric 14 and an outer eccentric 16 which can be coaxially arranged and angularly adjusted with respect to one another. A roller bearing 20 is located between the outer eccentric 16 and a vibration rod 18. The rod 18 is connected to a mass to be vibrated, shown schematically by the box M. The Mass is driven by the rod 18 into a reciprocating motion essentially along the direction denoted by the 2-way arrow a. The inner eccentric 14 sits on an inner hollow shaft 22 which is rotated in one direction via a bevel gear 24 through a drive shaft 26 and a driving bevel gear 28.

The drive shaft 26 rotates via the bevel gear 28 and a further bevel gear 30 rotates an outer hollow shaft 32 in the other direction. As support members for partial masses 36a and 36b, two partial disks 37a and 37b rest on the inner hollow shaft 22 via roller bearing 34, and, as described further below, both these disks 37a, 37b are rotatable relative to one another in order to bring the angular position of the partial mass 36a or 36b into a desired position.

Similarly, partial disks 41a and 41b supporting compensating weights 40b and 40a sit on the inner hollow shaft 22 via a roller bearing 38 axially spaced from the roller bearing 34.

Within the inner hollow shaft 22, an adjusting rod 42 is located which is connected via a roller bearing 44 with a piston rod 46 of a pneumatic or hydraulic cylinder 48, the piston of which has the reference numeral 49. The piston rod 46 conducts a reciprocating movement during the stroke displacement.

The adjusting rod 42 is provided in an axially spaced relationship with a proximal lateral pin 50 and a distal lateral pin 52, which thus provides a non-rotating connection between the displacing rod 42 and the inner hollow shaft 22 such that these lateral pins 50 and 52 project with both ends into oblong slots 54, 55 in which the lateral pins are slidably guided for axial movement, i.e. axial to the longitudinal axis of the displacing rod in the inner hollow shaft 22. Such a movement is possible when, for example, a hydraulically or pneumatically driven piston 49 is actuated in the displacement motor.

The proximal lateral pin 50 is provided on both sides respectively with a double roller arrangement via a roller bearing 56, one of the rollers being a guiding and supporting roller 58 and the other a slot following roller 60. The guiding and supporting rollers 58 run in longitudinal slots 62 which extend in the axial direction of the axis of the displacing rod 42, similar to the slot 54 and the slot 55. The following rollers 60 run in the inclined slots 64 which are arranged in curved transmitting members 66. These curved transmitting members 66 are respectively securely fastened to one of the partial disks 37a or 37b. However, it is also possible to form the longitudinal slot 62 such that this extends in a curved or inclined manner so that the roller 58 would be a slot following roller. Correspondingly, an axially extending supporting slit would be formed in the curved transmitting member 66.

In a corresponding manner, the distal lateral pin has to both sides respectively a guiding and supporting roller 68 extending in the longitudinal slot 55 and a slot following roller 70, which is respectively arranged in a slot 72 of a curved transmitting member 74. This transmitting member 74 is respectively connected with a partial disk 41a, 41b. An exchange can also take place here such that the longitudinal slot 55 is an inclined slot.

The partial disks 41a and 41b are respectively connected with the outer eccentric 16 or the inner eccentric 14 by means of a connecting member 77 or 79 such that an displacement of the partial disk simultaneously results in an displacement of the associated eccentric.

The inner hollow shaft 22 is supported at the distal end, i.e. the end opposite the drive in a further support bearing 76. A coupling device 78 is also located in this region. This coupling is formed by a coupling disk 80 connected with the inner hollow shaft 22 and a coupling disk 82 provided with the curved transmitting member 74. The coupling disks 82 and 80 are clamped by means of a spring 84 and coupling members 86. In this clamped condition, the relative position between the partial disks 37a, 37b or 41a and 41b is maintained, even if the entire arrangement is in operation. For the stroke displacement operation, a release of the coupling in the direction of arrow 88 in FIG. 1a is effected, the coupling being released in this condition and allowing an displacement of the partial disks and thus of the compensating weights relative to one another.

If as described above the coupling 68 is released, a displacement of the piston 49 and thus of the piston rod 46 allows for an axial displacement of the displacing rod 42. In this case, the lateral pins 50 and 52 glide in the slots 54 and 55 of the inner hollow shaft 22. The guiding and supporting roller 58 also moves in the slots 62 and the slot following member 60 in the slot 64 with the result that the partial disks 37a and 37b are rotated angularly with respect to one another and displaced so that the compensating masses 36a and 36b take up a different relative position with respect to one another. In the same way, a similar displacement ensues via the slit following member 70 for the partial disks 41a and 41b, a displacement of the eccentricity simultaneously resulting via the connecting members 77 and 79. If the desired setting of the compensating masses and the eccentricity for the desired vibrational movement is conducted in this way, the coupling 78 is closed so that no displacement of the set position can ensue by itself during the vibration operation.

Figure 3:
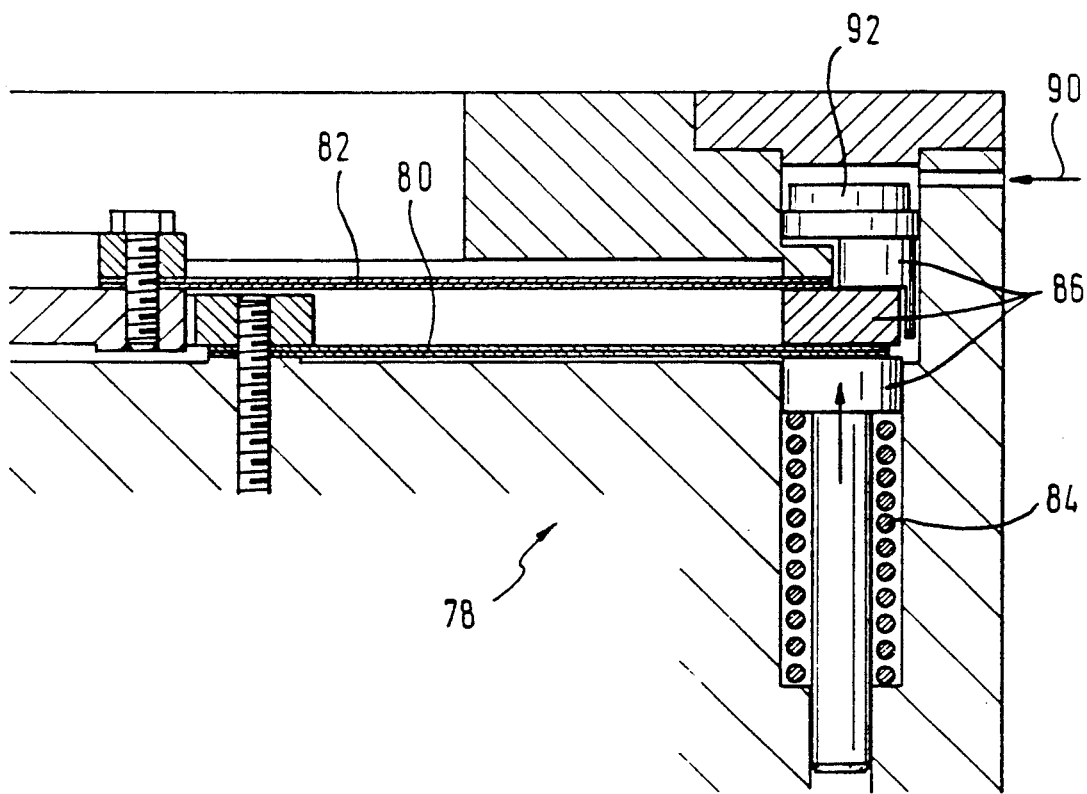
FIG. 3 shows a sectional view of a coupling device according to number III in FIG. 1a and 1b.

The coupling device 78 can be seen in more detail in FIG. 3. The arrow 90 indicates that the hydraulic or pneumatic operating means can be used to open the coupling or brake device which is closed by means of the spring 84, when the pressurized air acts on a piston 92.

Figure 4:
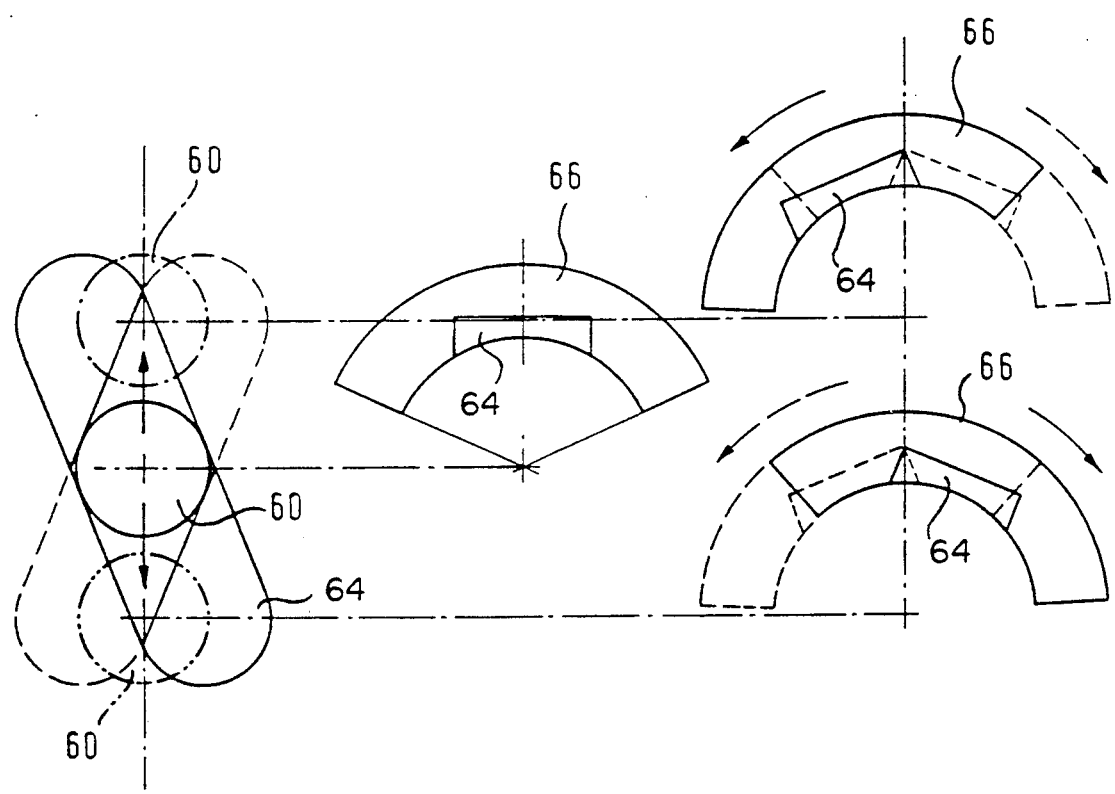
FIG. 4 shows a depiction of a cam steering according to the sectional arrangement IV—IV in FIG. 1a and 1b.

FIG. 4 shows the principle of a cam steering in the form of a slot following roller 60 and of the inclined slot 58 in the left hand part of FIG. 4. In this, the inclined position of the slot 58 is shown, namely in continuous lines for the one partial disk and in broken lines for the other partial disk, the dot-dashed and the double-dot-dashed lines showing the respective end positions of the slot following roller 60 during the movement in the one or other direction, namely in accordance with whether the displacing rod is being axially displaced in the one or other direction. In the center of the diagram, the curved transmitting member 66 is shown in the central position. In the right hand drawing, the respective final positions are shown.

The middle position shown in FIG. 4 is to be seen as the normal position in which the partial masses are located directly opposite one another such that the compensation is uneffective.

The coupling can be arranged as a driven plate. Additionally, a sensor shown schematically as dashed arrow S positioned, for example, proximate the vibration rod 18 is shown in FIGS. 1a and 1b, which registers the vibration and for vibrations of an unallowable strength, gives off a signal by means of which a quick shut-down of the vibration device can be effected.

The previously described cam steering for the displacement of the weights can be replaced by a lever steering. For this, one (50) of the lateral pins is connected with an angle lever via the bearing 56 (relative rotational movement), the center of rotation of the angle lever being fixed on the outer hollow shaft 32, and which angle lever (not shown in the drawing) transforms the axial movement of the displacing rod transmitted to a leg into an essentially peripheral movement transmitted to another leg, and this peripheral movement is transmitted to a section 66 of the compensating masses 36a, 36b. The other lateral pin 52 can also be connected with another angle lever not shown, the center of rotation of which is fixed on the hollow shaft 22. This angle lever transforms the axial movement of the displacing rod transmitted to a leg into an essentially peripheral movement transmitted to the other leg. This peripheral movement is transmitting to a section 74 of the other compensating mass 40a, 40b.

I claim:
1. A vibration device for reciprocating a mass along a line of motion between a first and second positions, said vibration device comprising:
a moving rod connected to said mass for applying a reversing force having a magnitude and a direction along said line of motion in order to cause said mass to reverse direction of motion at said first and second positions;
a first shaft-mounted compensating mass;
a second shaft-mounted compensating mass;
means for continuously rotating said first compensating mass in a first direction at a first fixed distance from an axis perpendicular to said line of motion;
means for continuously rotating said second compensating mass in a second direction counter to said first direction at a second fixed distance from said axis so that said first and second compensating masses repetitively pass by each other at a first and second crossing points;
an eccentric bearing connected to said first compensating mass so as to rotate with said first compensating mass, said bearing cooperating with said moving rod to provide said reversing force when said first and second compensating masses are located at said first and second crossing points, said reversing force including a centrifugal force generated by the rotating of said first and second compensating masses, the centrifugal force having a magnitude and being applied substantially along and in a direction of said reversing force of said bearing at each of the first and second crossing points; and
means for varying the magnitude of said reversing force along said line of motion.

2. A vibration device according to claim 1 wherein the means for varying comprises a displacing rod that is moveably connected to each first and second compensating masses, the displacing rod extending in an axial direction through a center of a hollow shaft for mounting at least one of the first and second compensating masses.

3. A vibration device according to claim 2, wherein the displacing rod is connected with a displacement motor for moving the displacing rod along the axial direction.

4. A vibration device according to claim 3 wherein the displacing rod is connected with the hollow shaft such that it cannot rotate relative to the shaft and is axially movable relative to the shaft, and wherein a bearing is positioned between the displacing rod and the displacement motor to allow the displacing rod to rotate relative to the displacement motor.

5. A vibration device according to claim 3 wherein the displacement motor comprises one of a hydraulic and pneumatic displacement device.

6. A vibration device according to claim 2, wherein the displacing rod includes axially spaced first and second lateral rods and the hollow shaft includes first and second pairs of corresponding longitudinal slots for engaging the first and second lateral rods, the slots being sized so that the first and second lateral rods are maintained substantially free of rotation relative to the hollow shaft and each of the first and second lateral rods extending outwardly from the hollow shaft through the slots and the first and second lateral rods being free to move axially a predetermined distance along corresponding first and second pairs of slots, the first and second lateral rods further including, at opposite ends thereof, end members and each of the compensating masses including means defining axially oriented recesses located proximate each of the first and second slots, the recesses receiving the end members so that axial movement of the first and second lateral rods cause the end members to move along the recesses, one of the first and second pairs of slots and the recesses being positioned at an angle relative to an axial direction so that axial movement of the lateral rods causes rotational displacement of the compensating masses relative to the shaft, whereby the magnitude of the reversing force is varied.

7. A vibration device according to claim 6, wherein the hollow shaft rotates in the first direction and the second lateral rod includes an end member having a bearing positioned thereon so that the second compensating mass can rotate in the second direction in communication with the second lateral rod as it moves axially along the second slot.

8. A vibration device according to claim 1, wherein the means for varying comprises a displacing rod positioned in an axial direction through a center of a hollow shaft over which each of the first and second compensating masses are positioned, the displacing rod including first and second lateral rods extending through corresponding first and second pairs of slots in the shaft and interconnected, respectively, with each of the first and second compensating masses, the first and second pairs of slots being oriented so that the first and second lateral rods can move in an axial direction relative to the shaft and are fixed in a rotational direction relative to the shaft, the second lateral rod including a bearing positioned so that the second compensating masses can rotate about the hollow shaft in the second direction as the shaft rotates in the first direction, each of the first and second compensating masses further including means for engaging the lateral rods, the means for engaging being positioned at an angle relative to the slot so that axial movement of the lateral rods by the displacing rod is translated into rotational movement of the at least a portion of the first and second compensating masses about the shaft whereby the magnitude of the reversing force is varied.

9. A vibration device according to claim 1, further comprising a rotating shaft for mounting the first and second compensating masses and first and second supporting members for carrying the first and second compensating masses upon the hollow shaft, the first and second supporting members each comprising first and second pairs of partial discs, each partial disc of the first pair carrying a portion of the first compensating mass and each partial disc of the second pair carrying a portion of the second compensating mass, each of the partial discs including a bearing to allow rotation of the partial discs relative to the hollow shaft.

10. A vibration device according to claim 9, wherein the means for varying includes a displacing rod positioned axially through a center of the rotating shaft, the displacing rod including means, interconnected with each of the first and second pairs of partial discs, for rotating at least one partial disc toward and away from the other partial disc of the first and second pairs of partial discs with respect to the hollow shaft.

11. A vibration device according to claim 10, wherein at least one of the pair of first partial disks is connected with the eccentric bearing.

12. A vibration device according to claim 11, wherein the eccentric bearing comprises two coaxial eccentric members respectively connected with each partial disk of the first pair of partial disks.

13. A vibration device according to claim 11, further comprising a releasable coupling interconnected between the hollow shaft and at least one of the first and second pairs of partial discs so that the partial discs are rotationally fixed with respect to the hollow shaft and are movable toward and away from one another only upon release of the coupling.

14. A vibration device according to claim 13, wherein the coupling comprises a driven plate.

15. A vibration device according to claim 1, further comprising a sensor means for sensing a predetermined magnitude of oscillation of the mass to signal a shutoff command to the vibration device in response to the predetermined magnitude.

16. A vibration device according to claim 1, wherein the means for varying includes means, interconnected with the eccentric bearing, for controlling the magnitude of the force applied to the mass in proportion to the magnitude of the centrifugal force of the compensating masses.

17. A vibration device according to claim 1, wherein the means for varying includes a releasable coupling for fixing the magnitude of the reversing force at a predetermined magnitude.

* * * * *